US011884802B2

(12) United States Patent
Yoon et al.

(10) Patent No.: US 11,884,802 B2
(45) Date of Patent: Jan. 30, 2024

(54) THERMOPLASTIC RESIN COMPOSITION HAVING HIGH RIGIDITY AND LOW COEFFICIENT OF LINEAR THERMAL EXPANSION AND MOLDED ARTICLE COMPRISING SAME

(71) Applicants: Hyundai Motor Company, Seoul (KR); Kia Corporation, Seoul (KR); HDC Hyundai Engineering Plastics Co., Ltd., Danjin-si (KR)

(72) Inventors: Jin Young Yoon, Gimpo-si (KR); Hee Joon Lee, Seoul (KR); Dong Eun Cha, Hwaseong-si (KR); Sun Jun Kwon, Seoul (KR); Chun Ho Park, Seoul (KR); Seung Ryong Jeong, Seoul (KR); Jin Bo Chae, Seoul (KR)

(73) Assignees: HYUNDAI MOTOR COMPANY, Seoul (KR); KIA CORPORATION, Seoul (KR); HDC HYUNDAI ENGINEERING PLASTICS CO., LTD., Dangjin-si (KR)

( * ) Notice: Subject to any disclaimer, the term of this patent is extended or adjusted under 35 U.S.C. 154(b) by 0 days.

(21) Appl. No.: 17/810,878

(22) Filed: Jul. 6, 2022

(65) Prior Publication Data
US 2023/0020121 A1    Jan. 19, 2023

(30) Foreign Application Priority Data
Jul. 6, 2021    (KR) .......................... 10-2021-0088631

(51) Int. Cl.
*C08L 23/12*    (2006.01)
*C08L 23/14*    (2006.01)

(52) U.S. Cl.
CPC ............... *C08L 23/12* (2013.01); *C08L 23/14* (2013.01); *C08L 2205/025* (2013.01); *C08L 2205/035* (2013.01); *C08L 2207/04* (2013.01)

(58) Field of Classification Search
CPC ............... C08L 23/12; C08L 2205/025; C08L 2205/035; C08L 2207/04
See application file for complete search history.

(56) References Cited

U.S. PATENT DOCUMENTS

| | | | | | |
|---|---|---|---|---|---|
| 4,988,764 | A | * | 1/1991 | Nishio | .................... C08L 51/06 525/183 |
| 5,829,804 | A | * | 11/1998 | Saeki | ...................... B60R 19/03 524/505 |
| 6,087,429 | A | * | 7/2000 | Yamamoto | .............. C08L 53/00 524/451 |
| 2007/0093592 | A1 | * | 4/2007 | Hwang | ................... C08L 53/00 524/515 |

FOREIGN PATENT DOCUMENTS

| | | |
|---|---|---|
| JP | 2009062526 A | 3/2009 |
| JP | 2012207062 A | 10/2012 |

\* cited by examiner

*Primary Examiner* — Arrie L Reuther
*Assistant Examiner* — Andrea Wu
(74) *Attorney, Agent, or Firm* — MCDONNELL BOEHNEN HULBERT & BERGHOFF LLP

(57) ABSTRACT

The present disclosure provides a thermoplastic resin composition having high rigidity and a low coefficient of linear thermal expansion and a molded article including the same. Specifically, the thermoplastic resin composition includes a polypropylene composite resin including high-crystalline polypropylene and the like, an elastomer, and an inorganic filler.

14 Claims, No Drawings

THERMOPLASTIC RESIN COMPOSITION HAVING HIGH RIGIDITY AND LOW COEFFICIENT OF LINEAR THERMAL EXPANSION AND MOLDED ARTICLE COMPRISING SAME

CROSS-REFERENCE TO RELATED APPLICATIONS

This application claims under 35 U.S.C. § 119(a) the benefit of priority from Korean Patent Application No. 10-2021-0088631, filed on Jul. 6, 2021, the entire contents of which are incorporated herein by reference.

TECHNICAL FIELD

The present disclosure relates to a thermoplastic resin composition having high rigidity and a low coefficient of linear thermal expansion and a molded article including the same.

BACKGROUND

With the trend of increasingly stringent international environmental regulations and fuel economy regulations and the rising price of energy resources, new technologies for the development of materials and parts for automobiles are urgently required from the viewpoints not only of simply improving fuel efficiency but also of increasing competitiveness according to environmental regulations.

A promising way to improve the fuel efficiency of automobiles is weight reduction technology. By reducing the weight thereof, engine efficiency may be improved, and the performance of automobiles may be maximized, whereby it can be expected that increased fuel efficiency will be shown.

The weight reduction of automobiles is broadly divided into weight reduction of materials achieved using hollow materials, weight reduction of materials achieved through foaming, and weight reduction of materials achieved through part thinning.

In general, the weight reduction of materials through thinning is achieved in a manner such that the thinning is carried out while maintaining the physical properties of parts using high-rigidity inorganic fillers such as long fibers, carbon fibers and the like. However, this method results in poor moldability, so the appearance of parts is not uniform during molding, and a problem of poor dimensional stability in the longitudinal and transverse directions may occur.

With the goal of solving this problem, composite polypropylene to which a high-fluidity resin and a high-rigidity inorganic filler are applied may be devised. However, if the injection flowability of the composite polypropylene is too high or too low, flow marks may be formed, and thin parts cannot be manufactured unless an appropriate inorganic filler is used. In particular, polypropylene as a base resin becomes crystallized during melting, molding, and cooling steps of injection molding, and dimensional stability is highly likely to be problematic due to the high shrinkage rate and the high coefficient of linear thermal expansion of polypropylene.

SUMMARY

Accordingly, an objective of the present disclosure is to provide an automobile exterior material having reduced weight through thin-part molding.

Another objective of the present disclosure is to provide a thermoplastic resin composition capable of producing a molded article having excellent mechanical properties such as rigidity and the like while simultaneously exhibiting good dimensional stability.

The objectives of the present disclosure are not limited to the foregoing, and will be able to be clearly understood through the following description and to be realized by the means described in the claims and combinations thereof.

An embodiment of the present disclosure provides a thermoplastic resin composition including a polypropylene composite resin including at least two selected from the group consisting of high-crystalline polypropylene resulting from polymerization of 0.1 wt % to 10 wt % of an alkylene monomer having 4 to 10 carbon atoms and 90 wt % to 99.9 wt % of a propylene monomer, an ethylene-propylene copolymer resulting from polymerization of 1 wt % to 50 wt % of an ethylene monomer and 50 wt % to 99 wt % of a propylene monomer, and a polypropylene elastomer resulting from polymerization of 20 wt % to 85 wt % of ethylene-propylene rubber and 15 wt % to 80 wt % of homopolypropylene, an elastomer including ethylene-α-olefin, and an inorganic filler, in which the thermoplastic resin composition has a flexural modulus (FM) of 2,500 MPa or more and a coefficient of linear thermal expansion (CLTE) of 60 μm/m·° C. or less.

The high-crystalline polypropylene may have a melt index (230° C., 2.16 kgf) of 90 g/10 min to 110 g/10 min.

The ethylene-propylene copolymer may have a melt index (230° C., 2.16 kgf) of 130 g/10 min to 150 g/10 min.

The polypropylene elastomer may have a melt index (230° C., 2.16 kgf) of 10 g/10 min to 20 g/10 min.

The polypropylene composite resin may include the high-crystalline polypropylene, the ethylene-propylene copolymer, and the polypropylene elastomer at a mass ratio of 1-3:1-3:1.

The elastomer may include at least one selected from the group consisting of ethylene-butene-olefin, ethylene-hexene-olefin, ethylene-octene-olefin, and combinations thereof.

The elastomer may include at least two selected from the group consisting of a first ethylene-α-olefin having a Mooney viscosity ($ML_{1+4}$, 125° C.) of 20 to 30, a second ethylene-α-olefin having a Mooney viscosity ($ML_{1+4}$, 125° C.) of 10 to 20, and a third ethylene-α-olefin having a Mooney viscosity ($ML_{1+4}$, 125° C.) of 1 to 10.

The inorganic filler may have a plate shape and a particle size of 1 μm to 12 μm.

The inorganic filler may include at least one selected from the group consisting of talc, mica, magnesium sulfate, barium sulfate, calcium carbonate, magnesium hydroxide, glass bubbles, and combinations thereof.

The thermoplastic resin composition may include 45 wt % to 60 wt % of the polypropylene composite resin, 15 wt % to 25 wt % of the elastomer, and 20 wt % to 30 wt % of the inorganic filler.

The thermoplastic resin composition may further include at least one additive selected from the group consisting of an antioxidant, an ultraviolet absorber, a nucleating agent, a coupling agent, a dispersant, a light stabilizer, a processing lubricant, a slipping agent, an antistatic agent, an inorganic pigment, and combinations thereof.

The thermoplastic resin composition may have a melt index (230° C., 2.16 kgf) of 35 g/10 min or more.

Another embodiment of the present disclosure provides a molded article including the thermoplastic resin composition described above.

The molded article may have tensile strength of 17 MPa or more and a heat deflection temperature of 120° C. or higher.

The molded article may be at least one automobile exterior material selected from the group consisting of a side sill molding, door molding, fender molding, quarter glass molding, roof rack, side outer garnish, roof molding garnish, back panel molding, tailgate garnish, and combinations thereof.

According to the present disclosure, it is possible to maximize the performance of automobiles by reducing the weight of an automobile exterior material.

In addition, according to the present disclosure, it is possible to obtain a thermoplastic resin composition capable of producing a molded article having excellent mechanical properties such as rigidity and the like while simultaneously exhibiting good dimensional stability.

The effects of the present disclosure are not limited to the foregoing, and should be understood to include all effects that may be reasonably anticipated from the following description.

DETAILED DESCRIPTION

The above and other objectives, features and advantages of the present disclosure will be more clearly understood from the following preferred embodiments taken in conjunction with the accompanying drawings. However, the present disclosure is not limited to the embodiments disclosed herein, and may be modified into different forms. These embodiments are provided to thoroughly explain the disclosure and to sufficiently transfer the spirit of the present disclosure to those skilled in the art.

Throughout the drawings, the same reference numerals will refer to the same or like elements. For the sake of clarity of the present disclosure, the dimensions of structures are depicted as being larger than the actual sizes thereof. It will be understood that, although terms such as "first", "second", etc. may be used herein to describe various elements, these elements are not to be limited by these terms. These terms are only used to distinguish one element from another element. For instance, a "first" element discussed below could be termed a "second" element without departing from the scope of the present disclosure. Similarly, the "second" element could also be termed a "first" element. As used herein, the singular forms are intended to include the plural forms as well, unless the context clearly indicates otherwise.

It will be further understood that the terms "comprise", "include", "have", etc., when used in this specification, specify the presence of stated features, integers, steps, operations, elements, components, or combinations thereof, but do not preclude the presence or addition of one or more other features, integers, steps, operations, elements, components, or combinations thereof. Also, it will be understood that when an element such as a layer, film, area, or sheet is referred to as being "on" another element, it may be directly on the other element, or intervening elements may be present therebetween. Similarly, when an element such as a layer, film, area, or sheet is referred to as being "under" another element, it may be directly under the other element, or intervening elements may be present therebetween.

Unless otherwise specified, all numbers, values, and/or representations that express the amounts of components, reaction conditions, polymer compositions, and mixtures used herein are to be taken as approximations including various uncertainties affecting measurement that inherently occur in obtaining these values, among others, and thus should be understood to be modified by the term "about" in all cases. Furthermore, when a numerical range is disclosed in this specification, the range is continuous, and includes all values from the minimum value of said range to the maximum value thereof, unless otherwise indicated. Moreover, when such a range pertains to integer values, all integers including the minimum value to the maximum value are included, unless otherwise indicated.

A thermoplastic resin composition having high rigidity and a low coefficient of linear thermal expansion according to the present disclosure includes a polypropylene composite resin as a base resin, an elastomer, and an inorganic filler.

The polypropylene composite resin is increased in moldability, mechanical rigidity and dimensional stability by adding high-crystalline polypropylene with an ethylene-propylene copolymer having high fluidity and good moldability and a polypropylene elastomer having high ethylene content.

The high-crystalline polypropylene may be obtained by polymerizing 0.1 wt % to 10 wt % of an alkylene monomer having 4 to 10 carbon atoms and 90 wt % to 99.9 wt % of a propylene monomer. When the amount of each component of the high-crystalline polypropylene falls within the corresponding range above, the melt index (230° C., 2.16 kgf) of the high-crystalline polypropylene may be 90 g/10 min to 110 g/10 min.

The ethylene-propylene copolymer may be obtained by polymerizing 1 wt % to 50 wt % of an ethylene monomer and 50 wt % to 99 wt % of a propylene monomer. When the amount of each component of the ethylene-propylene copolymer falls within the corresponding range above, the melt index (230° C., 2.16 kgf) of the ethylene-propylene copolymer may be 130 g/10 min to 150 g/10 min.

The polypropylene elastomer may be obtained by polymerizing 20 wt % to 85 wt % of ethylene-propylene rubber and 15 wt % to 80 wt % of homo-polypropylene. When the amount of each component of the polypropylene elastomer falls within the corresponding range above, the melt index (230° C., 2.16 kgf) of the polypropylene elastomer may be 10 g/10 min to 20 g/10 min. In the present disclosure, the compatibility between the polypropylene composite resin and the inorganic filler may be increased by the addition of the polypropylene elastomer, thereby maximizing the effect of impact reinforcement due to the inorganic filler.

The polypropylene composite resin may include the high-crystalline polypropylene, the ethylene-propylene copolymer, and the polypropylene elastomer at a mass ratio of 1-3:1-3:1. When the mass ratio of each component falls within the corresponding range above, moldability, mechanical rigidity, and dimensional stability may be uniformly improved.

The thermoplastic resin composition may include 45 wt % to 60 wt % of the polypropylene composite resin. If the amount of the polypropylene composite resin is less than 45 wt %, mechanical properties such as flexural modulus, tensile strength and the like of a molded article made of the thermoplastic resin composition may be deteriorated, whereas if the amount thereof exceeds 60 wt %, impact strength, etc. may decrease.

The elastomer is used to improve the impact resistance of a molded article made of the thermoplastic resin composition.

The elastomer may include ethylene-α-olefin, which is a copolymer of ethylene and α-olefin having 3 to 12 carbon atoms. The amount of α-olefin in the elastomer may be 10 wt % to 20 wt % based on the total weight of the elastomer. If the amount of α-olefin is less than 10 wt %, impact strength and impact resistance at low temperatures may be deteriorated, whereas if the amount thereof exceeds 20 wt %, rigidity may be deteriorated.

Specifically, the elastomer may include at least one selected from the group consisting of ethylene-butene-olefin, ethylene-hexene-olefin, ethylene-octene-olefin, and combinations thereof.

The elastomer is capable of improving impact resistance and rigidity in a balanced manner by combining two or more kinds of ethylene-α-olefin having different Mooney viscosities.

Specifically, the elastomer may include at least two selected from the group consisting of a first ethylene-α-olefin having a Mooney viscosity ($ML_{1+4}$, 125° C.) of 20 to 30, a second ethylene-α-olefin having a Mooney viscosity ($ML_{1+4}$, 125° C.) of 10 to 20, and a third ethylene-α-olefin having a Mooney viscosity ($ML_{1+4}$, 125° C.) of 1 to 10.

Moreover, the elastomer may include a combination of the first ethylene-α-olefin and the second ethylene-α-olefin or a combination of the first ethylene-α-olefin and the third ethylene-α-olefin. Here, the mixing ratio of each combination is not particularly limited, and may be appropriately adjusted depending on the desired physical properties. For example, the first ethylene-α-olefin and the second or third ethylene-α-olefin may be mixed at a mass ratio of 1:0.5-2.

The thermoplastic resin composition may include 15 wt % to 25 wt % of the elastomer. If the amount of the elastomer is less than 15 wt %, the impact strength of a molded article made of the thermoplastic resin composition may be deteriorated, whereas if the amount thereof exceeds 25 wt %, a ductility may be increased and thus a flexural modulus may be decreased.

The inorganic filler is used to achieve weight reduction of the molded article and to impart excellent mechanical rigidity, impact resistance, and dimensional stability thereto.

The inorganic filler has a plate-like structure, that is, takes the form of a thin film having a Z-axis length (thickness) smaller than the cross-sectional area represented by the X-axis and Y-axis lengths. Here, the diameter of the long axis among the X-axis and Y-axis lengths may be 1 μm to 12 μm. In the present specification, the long-axis diameter is defined as the particle size of the inorganic filler.

The inorganic filler may have a long-axis diameter/short-axis diameter ratio, that is, an aspect ratio, of 2 to 8. When the inorganic filler has an aspect ratio within the above range, the flowability of the composition including the same and the rigidity thereof may be improved, thus facilitating molding and imparting excellent dimensional stability to a molded article. Specifically, if the aspect ratio of the inorganic filler is less than the above lower limit, the improvement in rigidity and impact reinforcement may be remarkably deteriorated, whereas if it exceeds the above upper limit, it is difficult to disperse the inorganic filler during molding, so local differences in physical properties may occur.

The inorganic filler may include at least one selected from the group consisting of talc, mica, magnesium sulfate, barium sulfate, calcium carbonate, magnesium hydroxide, glass bubbles, and combinations thereof.

The thermoplastic resin composition may include 20 wt % to 30 wt % of the inorganic filler. If the amount of the inorganic filler is less than 20 wt %, the mechanical rigidity of the molded article may not be sufficiently improved, and the shape thereof may be easily deformed during handling. On the other hand, if the amount thereof exceeds 30 wt %, the weight reduction of the molded article may not be sufficient, and the dispersibility of the inorganic filler in the thermoplastic resin composition may be deteriorated, so the impact resistance of the molded article may be decreased.

The thermoplastic resin composition may have a melt index (230° C., 2.16 kgf) of 35 g/10 min or more. In the present disclosure, the melt index of the thermoplastic resin composition is adjusted so as to fall within the above range, thereby increasing the moldability of a thin-film part.

The thermoplastic resin composition may further include at least one additive selected from the group consisting of an antioxidant, an ultraviolet absorber, a nucleating agent, a coupling agent, a dispersant, a light stabilizer, a processing lubricant, a slipping agent, an antistatic agent, an inorganic pigment, and combinations thereof.

The antioxidant may include at least one selected from the group consisting of a phenol-based antioxidant, a phosphite-based antioxidant, thiodipropionate, and combinations thereof.

The slipping agent is used to improve scratch resistance by imparting slipperiness to the surface of a molded article using the thermoplastic resin composition. The slipping agent may include at least one selected from the group consisting of a siloxane-based slipping agent, an amide-based slipping agent, and combinations thereof.

The antistatic agent is used to reduce the generation of static electricity due to friction and to ensure that the additive is uniformly dispersed. The antistatic agent may include at least one selected from the group consisting of a low-molecular-weight antistatic agent, a high-molecular-weight antistatic agent, a conductive polymer, and combinations thereof.

In addition, the present disclosure pertains to a molded article produced using the thermoplastic resin composition. The method of manufacturing the molded article is not particularly limited, and may include various methods, such as injection, extrusion, and the like.

The molded article may be at least one automobile exterior material selected from the group consisting of a side sill molding, door molding, fender molding, quarter glass molding, roof rack, side outer garnish, roof molding garnish, back panel molding, tailgate garnish, and combinations thereof.

Also, the molded article is thin and is thus advantageous in view of reducing the weight of exterior materials, and simultaneously exhibits excellent mechanical rigidity, impact resistance, and dimensional stability. For example, the molded article may exhibit excellent mechanical strength and impact resistance even at a thickness of less than about 2.5 mm, or of 2.0 mm to 2.2 mm.

A better understanding of the present disclosure may be obtained through the following examples. These examples are merely set forth to illustrate the present disclosure, and are not to be construed as limiting the present disclosure.

Examples 1 to 4 and Comparative Examples 1 and 2

Respective thermoplastic resin compositions were prepared using components in the amounts shown in Table 1 below, and molded articles were produced therefrom using a twin-screw extruder having a diameter of 40 mm and L/D 52 under conditions of a temperature of 190 ° C. to 230 ° C. and an extruder screw speed of 250 rpm to 350 rpm.

TABLE 1

| Component | Example 1 | Example 2 | Example 3 | Example 4 | Comparative Example 1 | Comparative Example 2 |
|---|---|---|---|---|---|---|
| Polypropylene 1 | — | — | — | — | 25 | 20 |
| Polypropylene 2 | 13 | 20 | 13 | 20 | 18 | 15 |
| Polypropylene 3 | 30 | 20 | 30 | 20 | — | — |
| Polypropylene 4 | 10 | 10 | 10 | 10 | — | — |
| Elastomer 1 | 10 | 13 | 10 | 13 | 30 | 33 |
| Elastomer 2 | 10 | — | 10 | — | — | — |
| Elastomer 3 | — | 10 | — | 10 | — | — |
| Inorganic filler 1 | 25 | 25 | — | — | 25 | 30 |
| Inorganic filler 2 | — | — | 25 | 25 | — | — |
| Additive | 2 | 2 | 2 | 2 | 2 | 2 |
| Total [wt %] | 100 | 100 | 100 | 100 | 100 | 100 |

In Table 1, each component was as follows.

Polypropylene 1: Homo-polypropylene having a melt index (230° C., 2.16 kgf) of 20 to 40

Polypropylene 2: High-crystalline polypropylene having a melt index (230° C., 2.16 kgf) of 90 to 110, resulting from polymerization of an alkylene monomer and a propylene monomer Polypropylene 3: Ethylene-propylene copolymer having a melt index (230° C., 2.16 kgf) of 130 to 150, resulting from polymerization of an ethylene monomer and a propylene monomer Polypropylene 4: Polypropylene elastomer having a melt index (230° C., 2.16 kgf) of 10 to 20, resulting from polymerization of ethylene-propylene rubber and homo-polypropylene Elastomer 1: Ethylene-octene-olefin having a Mooney viscosity ($ML_{1+4}$, 125° C.) of 20 to 30

Elastomer 2: Ethylene-octene-olefin having a Mooney viscosity ($ML_{1+4}$, 125° C.) of 10 to 20

Elastomer 3: Ethylene-octene-olefin having a Mooney viscosity ($ML_{1+4}$, 125° C.) of 1 to 10

Inorganic filler 1: Talc having a plate shape and a particle size of 5 μm to 12 μm Inorganic filler 2: Talc having a plate shape and a particle size of 1 μm to 4 μm Additive: Antioxidant Test Example The physical properties of the molded articles according to Examples and Comparative Examples were measured using the methods under conditions shown in Table 2 below.

TABLE 2

| Item | Test methods | Test conditions |
|---|---|---|
| Melt index | ASTM D 1238 | Cylinder: 230° C., Load: 21.2 N (2.16 kgf) |
| Specific gravity | ASTM D 792 | — |
| Elongation Tensile strength | ASTM D 638 | Sample Type 1, Speed: 50 mm/min |
| Flexural modulus | ASTM D 790 | Sample: 127 × 12.7 × 6.4 mm, Speed: 10 mm/min |
| IZOD impact strength (23° C.) IZOD impact strength (−30° C.) | ASTM D 256 | Sample: 63.5 × 12.7 × 6.4 mm (Notched) |
| Heat deflection temperature | ASTM D 648 | Stress load: 0.45 MPa |
| Coefficient of linear thermal expansion | ASTM D 696-79 | Sample: 50 × 12.7 × 3.2 mm. During the test, the temperature is lowered to −40° C. at a rate of 10° C./min, maintained for 15 minutes, and raised to 80° C. at a rate of 1° C./min, and then the coefficient of linear thermal expansion in the range of −30° C. to 60° C. is measured. |

The results thereof are shown in Table 3 below.

TABLE 3

| Item | Unit | Example 1 | Example 2 | Example 3 | Example 4 | Comparative Example 1 | Comparative Example 2 |
|---|---|---|---|---|---|---|---|
| Melt index | g/10 min | 38 | 35 | 40 | 37 | 25 | 21 |
| Specific gravity | g/cm$^3$ | 1.08 | 1.10 | 1.08 | 1.10 | 1.08 | 1.12 |
| Elongation | % | 122 | 145 | 130 | 150 | 240 | 265 |
| Tensile strength | MPa | 18.2 | 17.5 | 19.5 | 18.2 | 16.8 | 17.2 |
| Flexural modulus | MPa | 2,510 | 2,590 | 2,690 | 2,650 | 1,660 | 1,720 |

TABLE 3-continued

| Item | Unit | Example 1 | Example 2 | Example 3 | Example 4 | Comparative Example 1 | Comparative Example 2 |
|---|---|---|---|---|---|---|---|
| IZOD impact strength (23° C.) | J/m | 348 | 379 | 362 | 381 | 392 | 404 |
| IZOD impact strength (−30° C.) | J/m | 42 | 46 | 45 | 47 | 49 | 50 |
| Heat deflection temperature | ° C. | 129 | 129 | 132 | 130 | 112 | 114 |
| Coefficient of linear thermal expansion | μm/m · ° C. | 57 | 56 | 56 | 55 | 55 | 52 |

As is apparent from Table 3, the thermoplastic resin composition according to the present disclosure had a melt index (230° C., 2.16 kgf) of 35 g/10 min or more, and a molded article obtained using the same exhibited specific gravity of 1.10 g/cm$^3$ or less, tensile strength of 17 MPa or more, a heat deflection temperature of 120° C. or higher, a flexural modulus of 2,500 MPa or more, and a coefficient of linear thermal expansion of 60 μm/m·° C. or less. Therefore, the present disclosure provides a thermoplastic resin composition that exhibits good moldability due to the high melt index thereof, contributes to weight reduction due to the low specific gravity thereof, and is excellent both in mechanical properties, such as tensile strength, flexural modulus and the like, and in dimensional stability, such as coefficient of linear thermal expansion and the like, even when applied to a thin molded article.

In contrast, Comparative Examples 1 and 2 had a low melt index, so the moldability was poor and the flexural modulus was too low.

Although specific embodiments of the present disclosure have been described with reference to the accompanying drawings, those skilled in the art will appreciate that the present disclosure may be embodied in other specific forms without changing the technical spirit or essential features thereof. Thus, the embodiments described above should be understood to be non-limiting and illustrative in every way.

What is claimed is:

1. A thermoplastic resin composition comprising:
a polypropylene composite resin comprising at least two selected from the group consisting of crystalline polypropylene resulting from polymerization of 0.1 wt % to 10 wt % of an alkylene monomer having 4 to 10 carbon atoms and 90 wt % to 99.9 wt % of a propylene monomer, an ethylene-propylene copolymer resulting from polymerization of 1 wt % to 50 wt % of an ethylene monomer and 50 wt % to 99 wt % of a propylene monomer, and a polypropylene elastomer resulting from polymerization of 20 wt % to 85 wt % of ethylene-propylene rubber and 15 wt % to 80 wt % of homo-polypropylene;
an elastomer comprising ethylene-α-olefin; and
an inorganic filler,
wherein the thermoplastic resin composition has a flexural modulus (FM) of 2,500 MPa or more and a coefficient of linear thermal expansion (CLTE) of 60 μm/m·° C. or less,
wherein the polypropylene elastomer has a melt index (230° C., 2.16 kgf) of 10 g/10 min to 20 g/10 min.

2. The thermoplastic resin composition of claim 1, wherein the crystalline polypropylene has a melt index (230° C., 2.16 kgf) of 90 g/10 min to 110 g/10 min.

3. The thermoplastic resin composition of claim 1, wherein the ethylene-propylene copolymer has a melt index (230° C., 2.16 kgf) of 130 g/10 min to 150 g/10 min.

4. The thermoplastic resin composition of claim 1, wherein the polypropylene composite resin comprises the crystalline polypropylene, the ethylene-propylene copolymer and the polypropylene elastomer, and the crystalline polypropylene, the ethylene-propylene copolymer, and the polypropylene elastomer at a mass ratio of 1-3:1-3:1.

5. The thermoplastic resin composition of claim 1, wherein the elastomer comprises at least one selected from the group consisting of ethylene-butene-olefin, ethylene-hexene-olefin, ethylene-octene-olefin, and combinations thereof.

6. The thermoplastic resin composition of claim 1, wherein the elastomer comprises at least two selected from the group consisting of a first ethylene-α-olefin having a Mooney viscosity (ML$_{1+4}$, 125° C.) of 20 to 30, a second ethylene-α-olefin having a Mooney viscosity (ML$_{1+4}$, 125° C.) of 10 to 20, and a third ethylene-α-olefin having a Mooney viscosity (ML$_{1+4}$, 125° C.) of 1 to 10.

7. The thermoplastic resin composition of claim 1, wherein the inorganic filler has a plate shape and a particle size of 1 μm to 12 μm.

8. The thermoplastic resin composition of claim 1, wherein the inorganic filler comprises at least one selected from the group consisting of talc, mica, magnesium sulfate, barium sulfate, calcium carbonate, magnesium hydroxide, glass bubbles, and combinations thereof.

9. The thermoplastic resin composition of claim 1, comprising:
45 wt % to 60 wt % of the polypropylene composite resin;
15 wt % to 25 wt % of the elastomer; and
20 wt % to 30 wt % of the inorganic filler.

10. The thermoplastic resin composition of claim 1, further comprising at least one additive selected from the group consisting of an antioxidant, an ultraviolet absorber, a nucleating agent, a coupling agent, a dispersant, a light stabilizer, a processing lubricant, a slipping agent, an antistatic agent, an inorganic pigment, and combinations thereof.

11. The thermoplastic resin composition of claim 1, wherein the thermoplastic resin composition has a melt index (230° C., 2.16 kgf) of 35 g/10 min or more.

12. A molded article comprising the thermoplastic resin composition of claim 1.

13. The molded article of claim 12, wherein the molded article has tensile strength of 17 MPa or more and a heat deflection temperature of 120° C. or higher.

14. The molded article of claim 12, wherein the molded article is at least one automobile exterior material selected from the group consisting of a side sill molding, door molding, fender molding, quarter glass molding, roof rack, side outer garnish, roof molding garnish, back panel molding, tailgate garnish, and combinations thereof.

* * * * *